July 8, 1958 W. A. SEMMION 2,842,022
EXPLOSIVE RIVET HAVING TUBULAR EXPANSION SHELL
Filed Nov. 4, 1953 2 Sheets-Sheet 1

INVENTOR.
WALTER A. SEMMION
BY
*Lynn H. Latta*
—ATTORNEY—

July 8, 1958 W. A. SEMMION 2,842,022
EXPLOSIVE RIVET HAVING TUBULAR EXPANSION SHELL
Filed Nov. 4, 1953 2 Sheets-Sheet 2
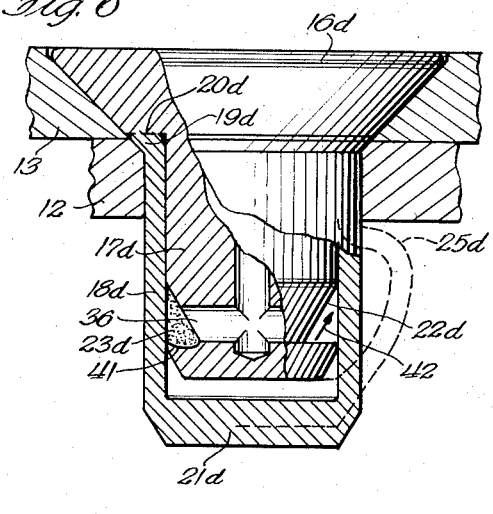
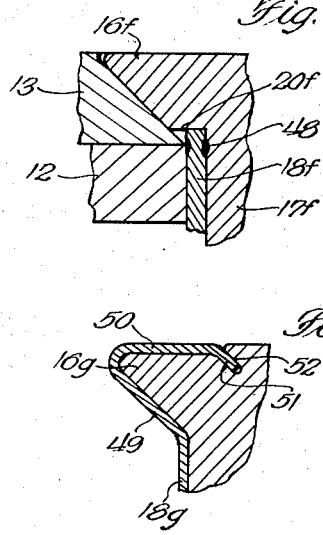
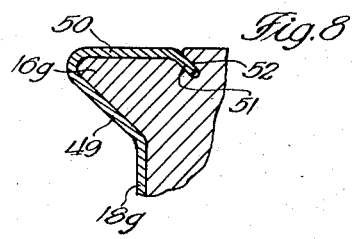
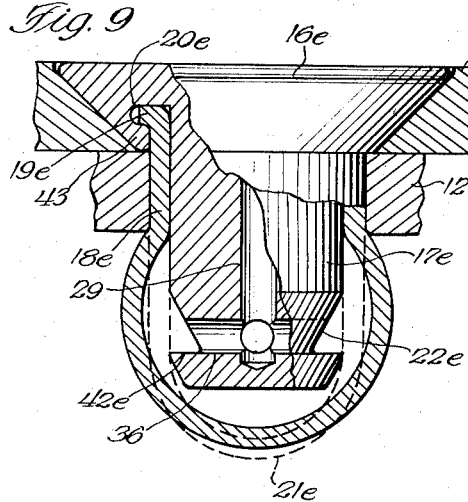
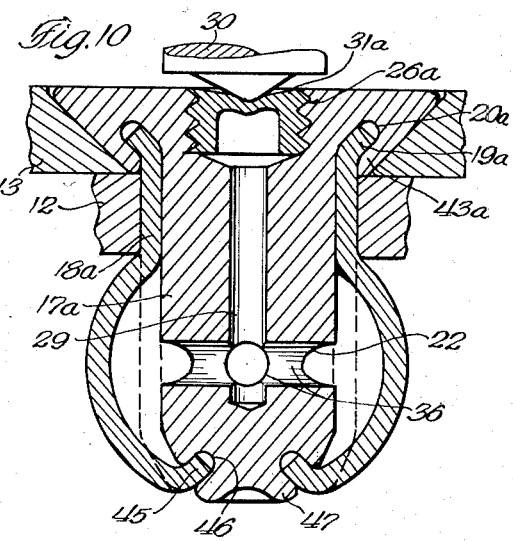
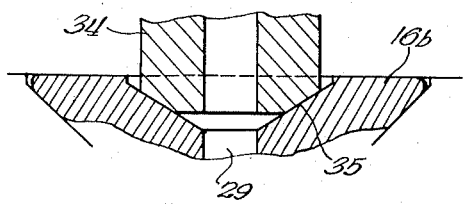
INVENTOR.
WALTER A. SEMMION
BY
Lynn H. Latta
—ATTORNEY—

United States Patent Office 2,842,022
Patented July 8, 1958

2,842,022

EXPLOSIVE RIVET HAVING TUBULAR EXPANSION SHELL

Walter A. Semmion, Los Angeles, Calif.

Application November 4, 1953, Serial No. 390,114

16 Claims. (Cl. 85—40)

This invention relates to rivets of the expanding type which are adapted for application and setting from one side of the assembly to be riveted together. Rivets of this type are invaluable in the manufacture of sheet metal structures having small depths and many walls or compartments where it is difficult or impossible to provide means for bucking or upsetting the shank end of the rivet. It is thus apparent that expanding rivets have important application in the fabrication of such items as aircraft tail surfaces, wing surfaces, door panels, fuselage component parts, guided missile parts and helicopter rotor blades. In general, the expanding rivets may be advantageously employed in any situation where poor riveting accessibility exists. Further, they may find general application in any case where positive locking means are required.

There have been many expanding rivets proposed in the prior art. Such rivets, whether of the explosive or hydraulically expansible type, are characterized by a hollow shank having simply a thin side wall and a closed end. Rivets of this hollow construction are lacking in shear strength and are highly unsatisfactory for use in structures which must be built to withstand severe stresses and strains.

It is a general object of this invention, therefore, to provide an expanding rivet of high shear strength which may be applied and set with a minimum expenditure of the operator's strength and energy, and without the use of special tools such as rivet guns, hydraulic compressors and the like; which may be easily and conveniently manufactured at a low unit cost; and which may be used with safety to both persons and property.

More specifically, it is an object of this invention to provide an expanding rivet having a core body comprising a solid head and a solid shank integral therewith, the shank being encased in a cylindrical shell of an expansible material which is securely locked to the shank at the juncture of the head and shank and closed at both ends so as to be expansible in response to fluid pressure applied thereto internally.

The shell is fitted to the shank so that the unexpanded length of the rivet which is received in openings in members to be secured together, is, in effect, a solid body throughout the full diameter thereof, so as to possess high resistance to shearing loads applied by said members, as contrasted to the tendency of a hollow rivet to be crushed and sheared by the members in the presence of such loads.

In attempting to attain shear strength in a hollow explosive rivet, to increase the wall thickness only increases the difficulty of expanding the rivet. The present invention contemplates a rivet in which the wall thickness of the shell may be determined without regard to shear strength requirements: in which, in fact, shear strength may actually be increased by decreasing the thickness of the shell wall, since by doing so the diameter of the core may actually be increased. To this end, the invention aims to provide a composite rivet utilizing a relatively hard core for shear resistance and an expansible shell of relatively soft metal, of minimum thickness consistent with adequate tensile strength in the expanded head, to resist loads applied axially to the rivet.

In one form of the invention the shank is provided with a horizontal annular channel of parabolic cross section which contains a charge of explosive material, said charge conforming to the cross sectional configuration of the channel. The locus of the focal points of an infinite number of parabolic cross sections of the channel is a circle having a diameter corresponding to the inner diameter of the shell. When the charge is detonated its entire explosive force is directed against a very narrow cylindrical section of the shell. Thus, maximum expansion of the rivet shell in an area directly opposite the shaped charge is obtained and the formation of an annular chamber in the shell which will tightly engage the work to be joined is assured.

In another form, the invention contemplates utilizing an annular channel in the core, as a means for distributing uniformly around the circumference of the inner surface of the shell, a fluid pressure derived from a source externally of the rivet.

It is a further object of this invention to provide an expanding rivet as characterized above in which the shank is provided with an axial bore or passage which extends from the head to approximately the plane of the horizontal channel, said axial passageway being in communication with the annular channel through a plurality of radial passageways, and such passage may be utilized as a means for conducting a detonating impulse to an explosive charge in the channel, or as for conducting fluid pressure from an outside source to the channel.

It is a further object of this invention to provide an expanding rivet as characterized above in which a detonating cap containing a detonating agent is screwed into a threaded hole in the rivet head, the top of the cap being disposed slightly below the top of the rivet and the bottom of the cap being in direct communication with the axial passageway. If a heat sensitive explosive is used, detonating cap may be replaced by a solid screw-like plug made of high heat conducting material such as aluminum, brass or copper. Detonation of the charge is readily accomplished by striking the top of the cap sharply with a center punch and hammer, or by placing the tip of a heated iron against it. When this is done the detonating agent ignites and burns through the inflammable bottom of the cap; the resultant flames travel through the axial passageway and the radial passageways connected therewith until they reach the shaped charge in the horizontal annular channel. At this point the charge is ignited and the directed explosion described above results.

Other objects and advantages of the invention will be apparent in the following description and accompanying drawings.

Fig. 6 is a partially elevational, partially sectional view of another modification of my invention;

Fig. 7 is a sectional view of a portion of the rivet showing an optional method of joining the shell to the core body;

Fig. 8 is a sectional view of a portion of the rivet showing another method of joining the shell to the core body;

Fig. 9 is a partially elevational, partially sectional view of another modification of my invention, showing in dotted lines the shell before the explosion, and, in full lines, the shell after the explosion;

Fig. 10 is a sectional view of another modification of my invention after the explosion has occurred; and Fig. 11 is a sectional view of a portion of the rivet and a cooperating gun which fires a priming charge as an alternate means for producing an explosion.

Figure 1:
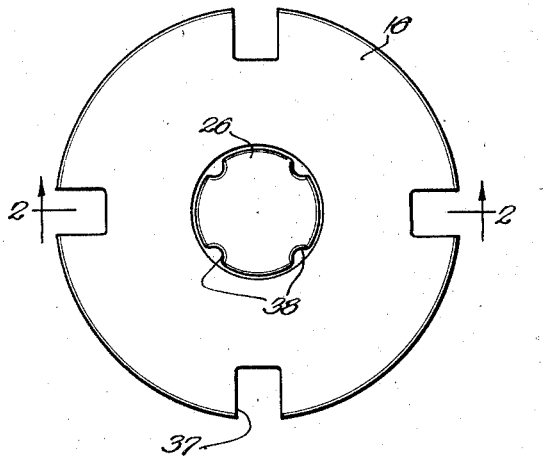
Fig. 1 is a plan view of one modification of my invention.
Figure 4:
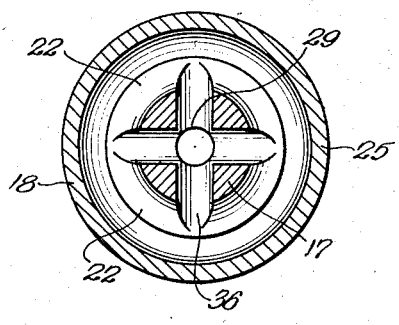
Fig. 4 is a sectional view along the line 4—4 of Fig. 3.
Figure 2:
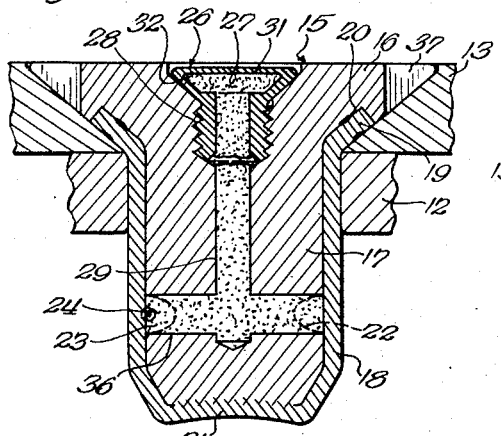
Fig. 2 is an axial sectional view along the line 2—2 of Fig. 1.

Referring now to the drawings in detail, Figs. 1, 2, 3, and 4 illustrate the preferred embodiment of my invention, comprising a composite rivet extended through registering openings in plates or sheets 12, 13 which are to be secured together. The rivet comprises a relatively hard core body 15 having a head 16 and a shank 17. The core body 15 may be of alloy steel. A shell 18, of more ductile alloy tightly encases the shank, the open end of the shell having a flaring flange 19 which conforms to a frustro-conical circumferential shoulder 20 at the base of head 16. The flange 19 is welded to the shoulder 20 around the circumference of the core body. The shell has a closed end 21 which is welded to the end of shank 17. The shank 17 is provided with an annular channel 22, said channel being of parabolic cross section and containing a charge of explosive material 23. The charge naturally assumes the parabolic configuration of the channel and thus may be described as a shaped charge. The locus of the focal points of all parabolic cross sections of channel 22 is a circle (indicated at 24) having a diameter corresponding to the inner diameter of the shell. Thus, when the shaped charge is detonated its entire expansive force is directed against a narrow cylindrical section of the shell directly opposite the charge, and the formation of a shoulder 25 of sufficient size and definition to firmly secure plates 12 and 13 to each other is assured. A detonating cap 26 containing a priming charge 27, is screwed into a threaded socket 28 in the rivet head, the top of the cap 26 being slightly below the top of the rivet head 16, for safety, and the bottom of the cap being in direct communication with an axial passageway 29. The charge 27 is detonated by striking the cap sharply, as by means of punch 30 (Fig. 10). This is accomplished in the rim fired detonating cap illustrated in Fig. 2 by the application of the striking force to the periphery of the top 31 of the cap so that the top strikes the inner surface of the frustro-conical section 32 of the cap. A centrally fired cap 26a is shown in Fig. 10, wherein detonation is accomplished by striking the center of the top 31a with center punch 30. Other methods of detonation could also be used. Thus, the application of heat from an electric soldering iron or similar device to the top 31 would also be effective to ignite the priming charge 27 and thus detonate the explosive charge 8.

Fig. 11 illustrates an alternate method of detonation where the rivet is not provided with an integral detonating cap. Instead, detonation is accomplished by means of a gun 34 which fires a priming charge into the axial passageway 29 of the rivet. The end of gun 34 may be bevelled to seat tightly against a bell mouth 35 at the outer end of passage 29, in the rivet head 16b.

Passage 29, at its inner end, communicates with cross passages 36 which extend radially to join annular channel 22. Passages 29 and 36 are filled with explosive material. However the ignition of the detonating agent is accomplished and the result is the same. From the priming charge, combustion proceeds through the axial passageway 29 and the radial passageways 36, burning the charge therein, until it reaches the shaped charge 23 contained in the annular channel 22, and the directed explosion described above then occurs.

Structural features of the rivet which may be noted are the tooling slots 37 with which the core body 15 is provided, and the wrenching notches 38 in the detonating cap 26 by means of which the cap may be readily threaded into the rivet head 16.

Fig. 10 illustrates, in expanded condition, a rivet embodying a modified form of the invention, wherein shell 18a is of sleeve form, consisting in simply a section of tubing, with one end formed inwardly to provide a reentrant flange 45 that is received in an annular groove 46 in the end of core shank 17a, groove 46 being initially open sufficiently to freely receive preformed flange 45, and subsequently closed by peening the end of shank 17a (resulting in an annular lip 47 being extruded outwardly to lock against flange 45).

Fig. 10 also illustrates a variation of the clinch-lock fastening of the shell to the rivet head, wherein flange 19a, groove 20a and flange 43a are frustro-conical. The modified primer cap shown in Fig. 10 has already been described.

Figure 5:
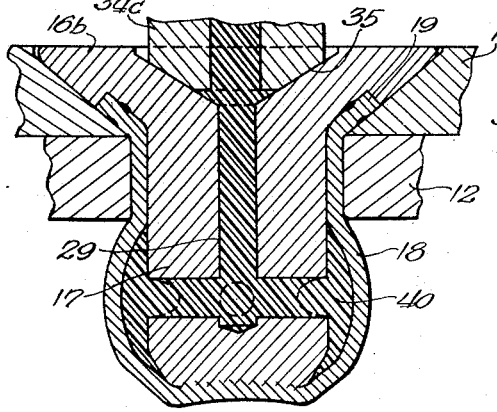
Fig. 5 is an axial sectional view of a modified form of the invention.

Fig. 5 illustrates a rivet that can be expanded by fluid pressure applied thereto through a nozzle, having its end seated against and sealed to bell mouth 35 in the head of the rivet. The fluid injected through the nozzle 34c into the rivet may be compressed air or other gas, or may be a plastic compound 40 or cement in a liquid form which, after initial injection under pressure which expands the rivet, subsequently hardens and fills the expanded chamber between the rivet shell and body shank, thus rendering the expanded rivet solid and substantially non-deformable under axial loads applied to the rivet by the parts which it secures together.

It will be understood that in this form of the invention, the channel 22 does not contain an explosive charge, but simply constitutes the terminal portion of the passage through which fluid pressure from an external source is injected into the rivet, the channel functioning to distribute the pressure uniformly around the circumference thereof.

Fig. 6 illustrates a modification of my invention. The open end of the shell 18d is not flanged but is merely headed slightly at 19d and butt welded to a squared shoulder 20d beneath head 16d, around its entire circumference. The extra step of welding the closed end of the shell to the end of the shank 17d is also omitted.

Figure 3:
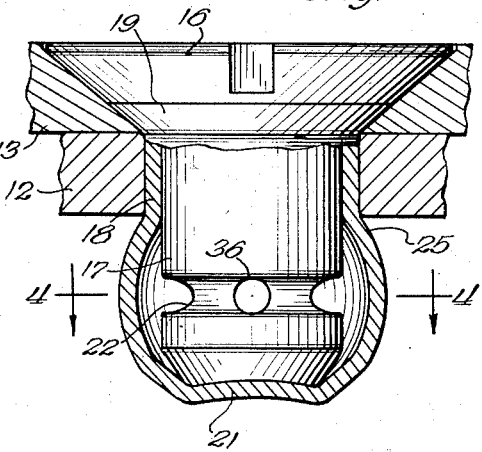
Fig. 3 is a side view of the exploded rivet with the shell broken away and shown in section.

An annular channel 22d of angular ("saw-tooth") cross section is substituted for the channel of parabolic cross section shown in Fig. 3. The bottom 41 of channel 22d is dished, as shown. This angular configuration has an advantage in that the explosive force of the charge 23d contained therein is directed upwardly toward plates 12 and 13 as well as outwardly, as indicated by arrow 42. The expansion of shell 18d thus results in an upward thrust of the shoulder 25d against the under surface of plate 12 and a tight engagement of plates 12 and 13 is thereby achieved.

In this form of the invention, the end 21d of shell 18d is thicker than the lateral wall of the shell, and in the unexpanded rivet, it is spaced from the end of shank 17d. When the charge is exploded, the end space allows the shell end 21d to be drawn toward the end of shank 17d, as indicated.

Fig. 9 illustrates another modification of my invention, wherein the open end flange 19e of the shell 18e is secured to the core body by means of a 90° clinch lock in an annular groove 20e in head 16e. Flange 43, which locks beneath flange 19e, may initially be flared outwardly so that groove 20e is wide enough at its mouth to receive flange 19e. Subsequently, flange 43 is pressed or swaged or rolled inwardly to establish the clinch lock. The closed end 21e of the shell is rounded and is not secured to shank 17e. The cross sectional configuration of the annular channel 22d differs slightly from that shown in Fig. 6 in that the bottom surface 42e of the channel is flat.

The corrosive effect of the gaseous by-products of the explosion may be minimized by evacuating the rivet by means of a suitable suction device. Corrosive products may also be removed or neutralized by the application of a suitable neutralizing solution to the interior of the rivet. When it is desirable to strengthen and stabilize the rivet by the injection under pressure of plastic materials 40 such as cement, low melt alloys, powdered metal base paste, sealing compound etc., into the cavity formed by the expansion of the shell, it is contemplated that a corrosive inhibiting agent will be added to the material to be injected. The corrosion inhibiting agent will thus serve to conteract the corrosive action of the plastic material used as well as the corrosive effect of the gaseous by-products of the explosion.

Fig. 7 illustrates how the shell 18f, instead of being welded or locked to the rivet head 16f may be welded, at 48, to shank 17f, while abutting a shoulder 20f beneath head 16f.

Fig. 8 shows another possible construction for anchoring the shell to the core, wherein shell 18g has a flared portion 49 fitted around the conical underside of head 16g, a rim 50 extending radially inwardly against the flat outer face of head 16g, and a reentrant flange 51 which is locked into a groove 52 in head 16g.

I claim:

1. In an expansible rivet: a core body comprising a shank having a cylindrical lateral wall and a head integral with said shank; a tubular shell surrounding said shank, attached to the body adjacent the junction between said head and shank, fitted to said lateral wall and having at its other end an end member which is welded to the end of said shank and sealed so as to provide for radial expansion of said shell by fluid pressure applied between said lateral wall of said shank and the inner wall of said shell; said shank having in its said lateral wall an annular channel communicating with said inner wall and opening to the shell, said body having means extending from said head axially in said shank and to said channel for communicating an ignition impulse thereto; and an explosive charge in said channel, facing said inner wall and adapted, when ignited, to effect said radial expansion.

2. In an expansible rivet: a core body comprising a head and a shank integral therewith, said body having a circumferential shoulder adjacent the juncture of the head and shank; a shell encasing said shank, one end of said shell being flanged outwardly and sealed and welded to said circumferential shoulder, and the other end of said shell being closed and welded to the end of said shank; said shank having a cylindrical outer wall provided with an annular channel located between the said juncture and the said end of the shank and opening to the shell, said core body having a passage extending through said head and axially into said shank to approximately the plane of said channel, and having a plurality of radial bores extending from said axial passage to said channel; means in said passage and in said radial bores for communicating an ignition impulse to said annular channel; and an explosive charge in said channel, facing the inner wall of said shell and adapted, when ignited, to apply to said shell an expanding force for bulbing said shell.

3. In an expansible rivet: a core body comprising a head and a shank integral therewith, said shank having a cylindrical lateral wall, said body having a circumferential shoulder adjacent the juncture of the head and shank; a shell encasing said shank and having a cylindrical inner wall fitted to said lateral wall, the free end of said shell being flanged outwardly and received tightly and welded to said circumferential shoulder, and the other end of said shell being closed and welded to the end of said shank; said shank having in its said lateral wall an annular channel located between the said juncture and said end of the shank, said channel being of parabolic cross-section, the locus of the focal points of all parabolic sections of said channel being a circle having a diameter corresponding to the inner diameter of the shell, and an explosive charge in said channel for applying an expanding force to said inner wall of the shell, and means for igniting said charge.

4. In an expansible rivet: a core body comprising a head and a cylindrical shank integral therewith, said body having a circumferential shoulder adjacent the juncture of the head and shank, a cylindrical shell encasing said shank, one end of said shell being flanged outwardly and sealed and welded to said circumferential shoulder, and the other end of said shell being closed and welded to the end of said shank; said shank having in its said lateral wall an annular channel located between the said juncture and said end of the shank in the outer wall of the shank and opening to said shell, said core body having a passage extending through said head and axially into said shank to approximately the plane of said channel, and having a plurality of radial bores extending from said axial passage to said channel; a charge of explosive material contained in the channel and in said passage and bores and a primer cap in the outer end of said passage for detonating the charge, whereby the cylindrical section of the shell opposed to the channel will be expanded radially outwardly of the force by the explosion caused by the detonation of said primer cap.

5. In an expansible rivet: a core body comprising a head and a shank integral with said head and having a cylindrical lateral wall, said body having a circumferential shoulder adjacent the juncture of the head and shank; a cylindrical shell encasing said shank and fitted to said lateral wall, one end of said shell being flanged outwardly and received tightly and welded to said circumferential shoulder, and the other end of said shell being closed and welded to the end of said shank; said shank having in its said lateral wall an annular channel located between the said juncture and said end of the shank, said channel being parabolic in cross-section, the locus of the focal points of all parabolic sections of said channel being a circle having a diameter corresponding to the inner diameter of the shell; a charge of explosive material contained in the channel, said charge conforming to the parabolic cross-sectional configuration of the channel; and means for detonating the charge whereby the cylindrical section of the shell opposed to the channel will be expanded radially outward by the force of the explosion caused by the detonation of said charge.

6. In an expansible rivet: a core body comprising a head and a shank integral with said head and having a cylindrical lateral wall, said body having a circumferential shoulder adjacent the juncture of the head and shank; a cylindrical shell encasing said shank and fitted to said lateral wall, one end of said shell being flanged outwardly and sealed and welded to said circumferential shoulder, and the other end of said shell being closed and welded to the end of said shank; said shank having in its said lateral wall an annular channel located between the said juncture and said end of the shank, said channel being parabolic in cross-section, the locus of the focal points of all parabolic sections of said channel being a circle having a diameter corresponding to the inner diameter of the shell; a charge of explosive material contained in the channel, said charge conforming to the parabolic cross-sectional configuration of the channel; said shank being provided with a passageway extending along its major axis to approximately the plane of the channel, and with a plurality of radial passageways extending from said axial passageway to the channel; and means for detonating the said charge, said detonating means being in communication with the charge through the said axial passageway and the said plurality of radial passageways whereby the cylindrical section of the shell opposed to the channel will be expanded radially outward by the force of the explosion created by the detonation of said charge.

7. An expansible rivet comprising a head, a shank integral with said head and provided with a cylindrical lateral wall, a cylindrical shell encircling said shank and fitted to said lateral wall, means for locking the upper and lower ends of said shell securely to the shank, an annular channel in said shank disposed in a plane normal to the axis of the shank, in said lateral wall and opening to the shell, a charge of explosive material contained in the channel, said shank being provided with a passageway extending along its major axis to approximately the plane of the channel, and with a plurality of radial passageways extending from said axial passageway to the channel; and means for detonating the said charge, said detonating means being in communication with the charge through the said axial passageway and the said plurality of radial passageways whereby the cylindrical section of the shell opposed to the channel will be expanded radially outward by the force of the explosion created by the detonation of said charge.

8. An expansible rivet comprising a head, a shank integral with said head and provided with a cylindrical lateral wall, a cylindrical shell encasing said shank and fitted to said lateral wall, means for locking the upper and lower ends of said shell securely to the shank, an annular channel in said lateral wall, said channel being of parabolic cross-section, the locus of the focal points of all parabolic sections of said channel being a circle having a diameter corresponding to the inner diameter of the shell; a charge of explosive material contained in the channel, said charge conforming to the parabolic cross-sectional configuration of the channel; said shank being provided with a passageway extending along its major axis to approximately the plane of the channel, and with a plurality of radial passageways extending from said axial passageway to the channel; and means for detonating the said charge, said detonating means being in communication with the charge through the said axial passageway and the said plurality of radial passageways whereby the cylindrical section of the shell opposed to the channel will be expanded radially outward by the force of the explosion created by detonation of the charge.

9. In an expansible rivet: a core body comprising a head and a shank integral therewith and having a cylindrical lateral wall, said body having a circumferential shoulder adjacent the juncture of the head and shank; a cylindrical shell encasing said shank and fitted to said lateral wall, the open end of said shell being flanged outwardly and sealed and welded to said circumferential shoulder; an end member integral with and closing the other end of said shell; said shank having in its said lateral wall an annular channel located between the said juncture and said end of the shank, said channel being parabolic in cross-section, the locus of the focal points of all parabolic sections of said channel being a circle having a diameter corresponding to the inner diameter of the shell; a charge of explosive material contained in the channel, said charge conforming to the parabolic cross-sectional configuration of the channel; said shank being provided with a passageway, extending along its major axis to approximately the plane of the channel, and with a plurality of radial passageways extending from said axial passageway to the channel; and a detonating cap in the top of said head, coaxial with said shank, the cap being in communication with the charge through the said axial passageway and the said plurality of radial passageways, whereby the cylindrical section of the shell opposed to the channel will be expanded radially outward by the force of the explosion created by the detonation of said charge.

10. In an expansible rivet: a core body comprising a shank having a cylindrical lateral wall, and a head integral with said shank at one end thereof, a tubular shell surrounding said shank, fitted to said lateral wall, having at one end a sealed attachment to the body in a zone encircling the body adjacent the junction between the shank and the head, and having its other end closed and attached to the shank at the other end thereof, whereby to define with said shank an expansible annular sealed chamber which, in the unexpanded rivet, is substantially filled by said shank; said shank having in its said lateral wall an annular channel opening to the shell and disposed in a plane normal to the shank axis near said other end of the shank, said body having means extending from said head in said shank axially and radially to said channel for communicating an ignition impulse from the head to said channel; a primer cap mounted in said head in transmitting relation to said communicating means; and an explosive charge in said channel, facing the inner wall of said shell and adapted to be ignited by said impulse and to apply to said shell an expanding force for bulbing said shell.

11. A rivet as defined in claim 10, wherein said communicating means comprises an axial passage extending along the axis of said shank, opening to said primer cap at one end and closed at its other end at a point spaced from said other end of the shank, and a radial passage extending from said closed end of said axial passage to said annular channel, said passages being open to provide a path of flow for the ignition impulse from said primer cap to said charge.

12. A rivet as defined in claim 10, wherein said communicating means comprises an axial passage extending along the axis of said shank, opening to said primer cap at one end and closed at its other end at a point spaced from said other end of the shank, and a radial passage extending from said closed end of said axial passage to said annular channel, and a train of powder filling said passages and operable to transmit said ignition impulse from said primer cap to said charge.

13. A rivet as defined in claim 10, wherein said cylindrical lateral wall of the shank is in contact with said inner wall of the shell on both sides of said channel, for concentrating the explosive force against said inner wall at its zone of communication with said channel.

14. A rivet as defined in claim 10, wherein said cylindrical lateral wall of the shank is in contact with said inner wall of the shell on both sides of said channel, for concentrating the explosive force against said inner wall at its zone of communication with said channel, and wherein said channel has a substantially parabolic cross-section with the parabolic axis thereof lying in said normal plane, and with its greatest width at its open outer extremity adjoining said inner wall of the shell.

15. A rivet as defined in claim 10, wherein said channel is of saw-tooth section, having a radial wall facing said head and disposed adjacent said other end of the shank, and having a frusto-conical wall extending diagonally from the base of said radial wall outwardly and toward said head, whereby the explosive force is directed outwardly and toward the head for pressing the bulbed portion of the shell against the work.

16. In an expansible rivet: a core body comprising a shank and a head integral with said shank; a tubular shell surrounding said shank, attached and sealed at one end to the body adjacent the junction between said head and shank, and sealed at its other end to define, with said shank, an expansible annular chamber which, in the unexpanded rivet, is substantially filled by said shank; said shank having a cylindrical wall provided with an annular channel communicating with said chamber and opening to the shell, said body having means extending from siad head axially in said shank and to said channel for communicating an ignition impulse thereto; and an explosive charge in said channel, facing the inner wall of said shell and adapted, when ignited, to apply to said shell an expanding force for bulbing said shell, said shell being of sleeve form, with its end remote from said head being anchored and sealed to and closed by the end of said shank.

References Cited in the file of this patent

UNITED STATES PATENTS

| 1,400,401 | Allan | Dec. 13, 1921 |
| 1,534,011 | Watson | Apr. 14, 1925 |
| 1,994,210 | Chobert | Mar. 12, 1935 |
| 2,342,866 | Jakosky | Feb. 29, 1944 |
| 2,463,185 | Kremer | Mar. 1, 1949 |
| 2,479,702 | Rood | Aug. 23, 1949 |
| 2,550,357 | Jansen et al. | Apr. 24, 1951 |
| 2,621,895 | Tooelke | Dec. 16, 1952 |

FOREIGN PATENTS

| 89,450 | Sweden | June 8, 1937 |